United States Patent
Sinzig et al.

(10) Patent No.: US 12,226,043 B2
(45) Date of Patent: Feb. 18, 2025

(54) COFFEE MAKER

(71) Applicant: Schaerer AG, Zuchwil (CH)

(72) Inventors: Peter Sinzig, Moosseedorf (CH);
Bruno Aeberhard, Zuchwil (CH);
Andy Lienhard, Derendingen (CH);
Franco Kissling, Solothurn (CH);
Miguel Alexandre Pinto Da Costa, Oberramsern (CH)

(73) Assignee: SCHAERER AG, Zuchwil (CH)

( * ) Notice: Subject to any disclaimer, the term of this patent is extended or adjusted under 35 U.S.C. 154(b) by 33 days.

(21) Appl. No.: 17/232,759

(22) Filed: Apr. 16, 2021

(65) Prior Publication Data

US 2021/0228018 A1     Jul. 29, 2021

Related U.S. Application Data

(63) Continuation of application No. 16/083,698, filed as application No. PCT/EP2017/055556 on Mar. 9, 2017, now abandoned.

(30) Foreign Application Priority Data

Mar. 11, 2016   (CH) ..................................... 00321/16

(51) Int. Cl.
*A47J 31/44*         (2006.01)

(52) U.S. Cl.
CPC ................................ *A47J 31/4403* (2013.01)

(58) Field of Classification Search
CPC .. A47J 31/462; A47J 31/4496; A47J 31/4489; A47J 31/4485; A47J 31/46;

(Continued)

(56) References Cited

U.S. PATENT DOCUMENTS 5,957,033 A    9/1999   In-Albon
2009/0173237 A1*   7/2009   Chen ................... A47J 31/0657
                                                                        99/302 R (Continued)

FOREIGN PATENT DOCUMENTS

CH          682798  A5    11/1993
EP       0 761 150  A1     3/1997

(Continued)

OTHER PUBLICATIONS

International Search Report from Corresponding International Application No. PCT/EP2017/055556 mailed Jul. 19, 2017.

(Continued)

*Primary Examiner* — Phuong T Nguyen
(74) *Attorney, Agent, or Firm* — Wentsler LLC (57) ABSTRACT

A coffee maker for automatically preparing a coffee beverage, and optionally other beverages, having a housing, in which the grinder, brewing device, and boiler, for example, are accommodated, and an outlet unit, by way of which the desired beverage is dispensed. In the outlet unit, an outlet arrangement is provided, in which a plurality of tubular outlets are arranged side-by-side, and which are removably mounted in the outlet unit. On the front side of the housing, a display and operating unit can be arranged, by way of which the desired coffee beverage can be inputted, and by way of which information about the respective coffee beverage and/or the operational state of the machine are outputted. On the upper side of the housing, storage containers can be arranged, in which basic ingredients for the preparation of the coffee beverage, and other beverages as the case may be, are kept.

8 Claims, 5 Drawing Sheets

(58) Field of Classification Search
CPC ...... A47J 31/56; A47J 31/545; A47J 31/4403; A47J 31/52
USPC .......................... 99/280, 284, 290, 294, 300
See application file for complete search history.

(56) References Cited

U.S. PATENT DOCUMENTS

| | | |
|---|---|---|
| 2014/0034676 A1 | 2/2014 | Verduin et al. |
| 2014/0123860 A1 | 5/2014 | Bodum |
| 2014/0332561 A1* | 11/2014 | Rey .......................... A47J 31/46 222/145.5 |
| 2015/0196160 A1* | 7/2015 | De'Longhi ......... A47J 31/4489 99/294 |
| 2015/0208849 A1* | 7/2015 | Melzer ................. A47J 31/4403 99/287 |
| 2020/0237137 A1* | 7/2020 | Bakke ..................... A47J 31/54 |

FOREIGN PATENT DOCUMENTS

| | | |
|---|---|---|
| EP | 1 199 016 A1 | 4/2002 |
| EP | 2 080 457 A1 | 7/2009 |
| EP | 2 896 332 A1 | 7/2015 |
| WO | 2012/121598 A1 | 9/2012 |

OTHER PUBLICATIONS

Written Opinion from Corresponding International Application No. PCT/EP2017/055556 mailed Jul. 19, 2017.

* cited by examiner

COFFEE MAKER

CROSS-REFERENCE TO RELATED APPLICATIONS

This application is a continuation of and claims benefit of U.S. patent application Ser. No. 16/083,698 filed on Sep. 10, 2018, which is a 371 of International Application No. PCT/EP2017/055556 filed on Mar. 9, 2017, and claims benefit to Swiss Application No. 00321/16 filed on Mar. 11, 2016, all of which are incorporated herein in their entirety by reference thereto.

FIELD OF TECHNOLOGY

The present invention relates to the field of beverage preparation. It relates to a coffee machine as per the preamble of claim 1.

TECHNOLOGICAL BACKGROUND

In the case of coffee machines of the type mentioned in the introduction, it is known for a flow outlet to be fastened adjustably in terms of height directly to the outside of the housing so as to be positioned in front of or below the front panel. In the case of this design, the adjustment travel is however limited by the front panel itself or by operator control elements on the front panel, such that said flow outlet has hitherto been able to compensate only a height difference between a cup and relatively small pots or jugs. For the filling of glass jugs or even large thermos flasks, it has, as before, been necessary for a further flow outlet positioned at a greater height to be provided.

EP 1 199 016 A1 now proposes realizing a much greater height adjustment range for a flow outlet arranged in the region of the front panel, in a simple manner in terms of construction, by means of a height-adjustable front panel, and making it possible for functional parts such as for example feed hoses to be concealed behind the front panel, without disrupting the appearance of the operator control surface.

A height-adjustable front panel of said type is thus provided in the prior art only, in interaction with the outlet unit or the flow outlet, for realizing a greater adjustment range for the latter.

It is however also conceivable for the height adjustability of the front panel with its operator control and readout elements to be utilized for allowing access to intervention facilities that are concealed during normal operation. In particular, in this way, it is possible to realize an intervention facility for servicing purposes, which can be easily reserved for personnel authorized for this purpose.

Presentation of the Invention

It is an object of the invention inter alia to provide a coffee machine of the type mentioned in the introduction which does not have the disadvantages mentioned above and other disadvantages. In particular, such a coffee machine of the type mentioned in the introduction should permit simplified cleaning.

These and other objects are achieved by means of a coffee machine according to the invention as per independent claim 1 and independent claim 5. Further preferred embodiments are specified in the dependent claims.

One aspect of the invention relates to a coffee machine for the automatic preparation of a coffee beverage and possibly further beverages comprises a housing, in which the technical means necessary for preparing the coffee beverage, such as for example grinding mechanism, brewing device, boiler, are accommodated, and an outlet unit, via which the desired beverage, possibly together with flavoring or other additives, is dispensed. In the outlet unit, there is provided an outlet arrangement in which a multiplicity of tubular outlets composed of an elastomer material, in particular silicone rubber or rubber, are arranged adjacent to one another, into which outlets lines for the beverages and/or beverage additives issue, and which outlets are mounted removably in the outlet unit for the purposes of easy cleaning.

In the case of a coffee machine of said type, stable crusts that have formed on the lower outlets as a result of liquid residues can be easily removed by virtue of the outlets being deformed for cleaning purposes, such that accumulated crusts flake off.

Said outlets may be part of an outlet plate which is at least partially composed of an elastomer material and which extends transversely with respect to the outlet direction.

In such an embodiment, the outlet plate may, as an independent part, be composed entirely of the elastomer material and be held in the outlet unit by means of a holding frame which can be mounted and latched in from below.

Alternatively, the outlet plate may be constructed as a composite part from an elastomer seal part and from a dimensionally stable frame part connected to said seal part, and may, by way of the frame part, be insertable with latching-in action into the outlet unit.

Another aspect of the invention relates to a coffee machine for the automatic preparation of a coffee beverage and possibly further beverages, comprising a housing, in which the technical means necessary for preparing the coffee beverage, such as for example grinding mechanism, brewing device, boiler, are accommodated, a readout and operator control unit, which is arranged on the front side of the housing and by means of which the desired coffee beverage can be input and on which information regarding the respective coffee beverage and/or operating state of the machine is output, an outlet unit, which is arranged below the readout and operator control unit and via which the desired beverage, possibly together with flavoring or other additives, is dispensed, and storage containers, which are arranged on the top side of the housing and in which raw materials, in particular coffee beans, for the preparation of the coffee beverage and possibly further beverages, are held ready. The readout and operator control unit is, in order to allow access to the interior of the machine, designed to be movable in terms of height between a normal position and a service position situated above said normal position.

Such a coffee machine according to the invention accordingly provides targeted access to otherwise concealed intervention facilities, which facilitates the cleaning of the coffee machine.

One refinement of the coffee machine according to the invention is characterized in that the storage containers are mounted removably on the top side of the housing, that the storage containers are lockable in the mounted state, and that, behind the readout and operator control unit, there is arranged an actuation mechanism by means of which the storage containers can be locked in the mounted state and unlocked and which is accessible for the actuation when the readout and operator control unit is situated in the service position.

Thus, if the storage containers fixedly locked to the machine are to be removed from the machine for the purposes of filling and/or cleaning, the readout and operator control unit is moved upward into the service position, such that an actuation mechanism arranged behind said readout and operator control unit is made accessible, with the aid of which actuation mechanism the storage containers can be unlocked preferably jointly and simultaneously.

If the storage containers each have a dispensing opening which can be opened and closed by means of a slide, it is advantageous if the actuation mechanism opens the respective slide simultaneously with the locking of the mounted storage containers and closes the respective slide with the unlocking.

The closing of the containers before the removal has the advantage that no contents still situated in the containers can escape in uncontrolled fashion after the removal of the containers.

The actuation mechanism may in particular have a pivotable actuation lever which is pivotable between a locking position, in which the storage containers are locked, and an unlocking position, in which the storage containers are unlocked.

In this way, particularly simple and disruption-free mechanical locking and unlocking is possible.

Another embodiment of the coffee machine according to the invention is characterized in that the outlet unit is designed to be movable in terms of height, and that means are provided which effect a uniform movement of the outlet unit in terms of height.

Such means counteract the effect whereby the outlet unit, owing to its inherent weight, is more easily movable downward than upward, and thus facilitate the operator control of the machine and the setting of a selected outlet height.

In particular, for this purpose, the outlet unit may be connected to the free end of a spring strip which can be rolled up, which spring strip is unrolled from a rolled-up rest state when the outlet unit is moved downward, and rolls up again when the outlet unit is moved upward.

Such a solution for the outlet unit is not restricted to the present coffee machine, but rather may also be advantageously used in other coffee machines.

Yet another embodiment of the coffee machine according to the invention is characterized in that, in the outlet unit, there is provided an outlet arrangement in which a multiplicity of tubular outlets composed of an elastomer material, in particular silicone rubber or rubber, are arranged adjacent to one another, into which outlets lines for the beverages and/or beverage additives issue, and which outlets are mounted removably in the outlet unit for the purposes of easy cleaning.

The outlets sealingly close off the lines for conducting the beverages and/or beverage additives, and thus form end pieces of said lines, on which residues of the beverages and/or beverage additives can possibly adhere, and form crusts, after use. Since the outlets are composed of elastomer material, they can be particularly easily cleaned, wherein, by deforming the material, solid crusts and residues can be easily flaked off. If the outlets are removable from the outlet unit, the cleaning can be further simplified and facilitated.

Accordingly, the outlets may in particular be part of an outlet plate which is at least partially composed of an elastomer material and which extends transversely with respect to the outlet direction.

In particular, the outlet plate may be a molded part in which the outlets are integrally molded.

In particular, the outlet plate may, as an independent part, be composed entirely of the elastomer material and be held in the outlet unit by means of a holding frame which can be mounted and latched in from below.

It is however also conceivable for the outlet plate to be constructed as a composite part from an elastomer seal part and from a dimensionally stable frame part connected to said seal part, and to be, by way of the frame part, insertable with latching-in action into the outlet unit.

In this way, the removal for cleaning purposes, and the reinsertion, can be further simplified.

It is self-evident that this type of outlet unit can also be advantageously used in other coffee machines, in particular coffee machines which operate with syrup-like flavoring additives.

A further embodiment of the coffee machine according to the invention is characterized in that the readout and operator control unit comprises a touch-sensitive display for the input and readout of information, and that an electronic analog readout in the manner of a pointer instrument, which indicates the brewing pressure, is arranged outside, in particular below, the display.

Such an electronic manometer, which replicates a mechanical manometer and in which the pointer and scale are replicated and presented on a circular display, provides the user of the coffee machine with the impression and the information that would be provided in the case of a classic espresso machine. The pressure readout interacts with an electronic pressure sensor which is situated in the interior of the machine at a suitable location.

This type of "classic" pressure readout can also be readily used in other coffee machines. It is also conceivable to realize and provide an analog temperature readout in this way.

Another embodiment of the coffee machine according to the invention is characterized in that, to the left and right of the outlet unit, a hot-water outlet and a steam lance are arranged so as to project out downward, and that the hot-water outlet and the steam lance are, on the readout and operator control unit, each assigned a corresponding hot-water button and steam button for activation purposes.

By means of a corresponding spatial assignment of the outlets for hot water and steam and of the assigned operating buttons, intuitive operator control of the machine can be achieved, which requires no special menu control or text labelling.

Yet another embodiment of the coffee machine according to the invention is characterized in that the storage containers are each equipped with a closable cover, and that at least one of the storage containers has, in the cover, an introduction slot for the insertion of a cleaning tablet.

The closable cover prevents unauthorized persons from obtaining access to the interior of the containers and for example incorrectly filling or contaminating the storage containers or the like.

A further embodiment of the coffee machine according to the invention is characterized in that the storage containers each have a standing bracket which can be folded out and which allows the removed and possibly filled storage container to stand in a stable manner. This reliably prevents the removed storage containers from falling on their side and inadvertently emptying their contents to the outside.

Further ease of servicing can be achieved in the case of the coffee machine if the housing has removable side and/or rear walls which are held magnetically on the housing.

In this way, it is possible for the side and/or rear walls to be quickly and easily removed for servicing purposes, and reattached at a later point in time, without the use of tools.

BRIEF DESCRIPTION OF THE DRAWINGS

The invention will be discussed in more detail below on the basis of exemplary embodiments in conjunction with the drawings. The drawings merely show exemplary embodiments of the subject matter of the invention. In the drawings.

WAYS OF IMPLEMENTING THE INVENTION

The examples given below serve for improved illustration of the invention but are not capable of limiting the invention to the features disclosed herein.

Figure 1:
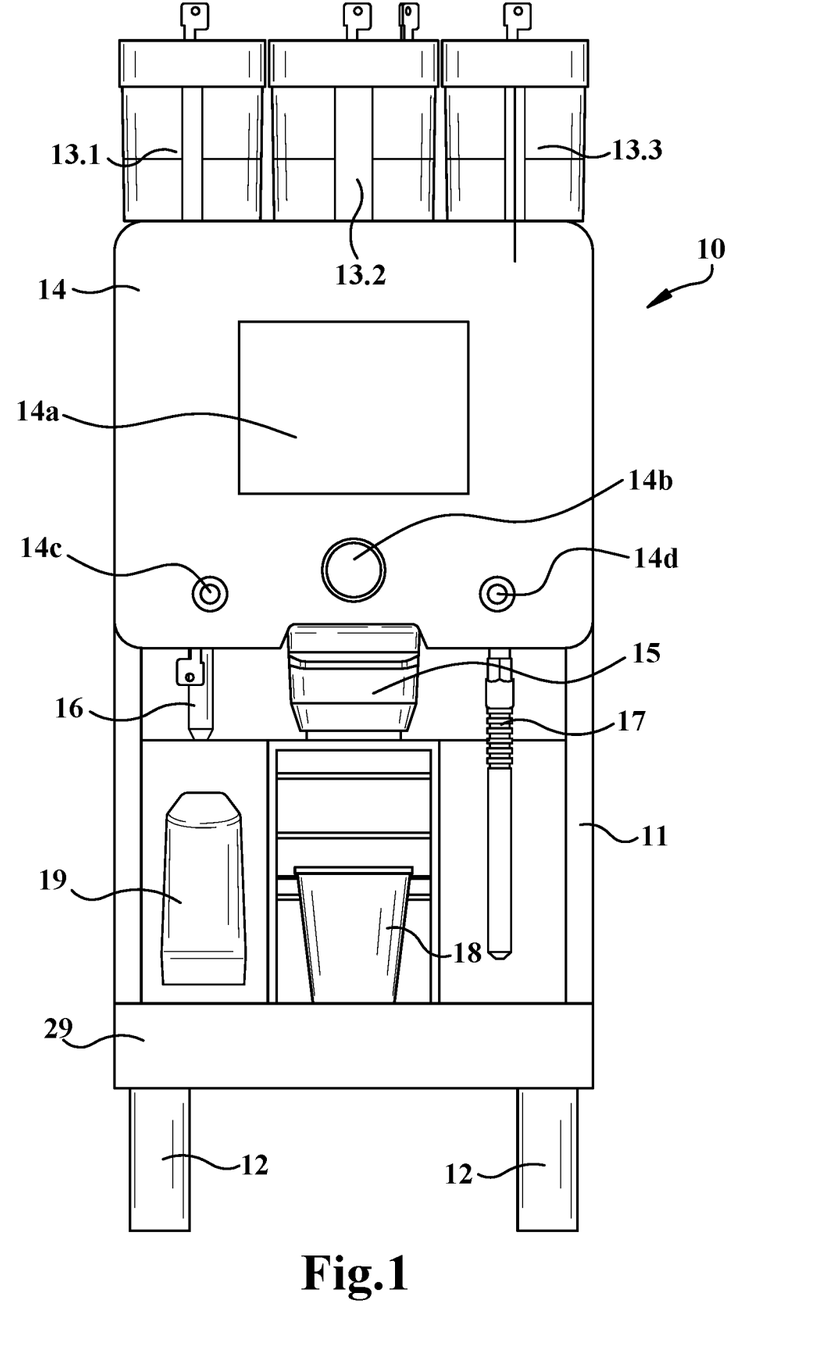
FIG. 1 shows, in a view from the front, an exemplary embodiment of a coffee machine according to the invention with three mounted storage containers.

FIG. 1 shows, in a view from the front, an exemplary embodiment of a coffee machine according to the invention with three mounted storage containers 13.1, 13.2 and 13.3. The coffee machine 10 of FIG. 1 has a housing 11 with feet 12, in which housing there are accommodated (in a manner not visible in FIG. 1) the technical means required for the preparation of the coffee beverage, such as for example grinding mechanism, brewing device, boiler, and possibly also internal containers with flavoring additives.

On the front side of the housing 11 there is arranged a rectangular readout and operator control unit 14 with rounded corners, by means of which the desired coffee beverage or else other beverages, such as for example hot cocoa, can be input and on which information regarding the respective coffee beverage (or other beverage) and/or the operating state of the machine is output.

The readout and operator control unit 14 comprises a centrally arranged, likewise rectangular, touch-sensitive display 14a for the inputting and readout of information within a menu which can be called up. Arranged centrally below the display 14a is an electronic analog readout 14b in the manner of a pointer instrument, which replicates a mechanical manometer with pointer and scale and which indicates the brewing pressure electronically recorded in the machine.

Arranged below the readout and operator control unit 14 is an outlet unit 15 which, for operator control, has a grip plate (15b in FIG. 4) and by means of which the desired beverage, possibly together with flavoring or other additives (for example milk), is dispensed. The outlet unit 15 has a special internal construction and is height-adjustable in a particular manner, as will be described and discussed in more detail further below in conjunction with FIGS. 4, 5 and 6.

Arranged below the outlet unit 15 is a collecting tray 29 which is covered by a perforated plate or by a grating, onto which a cup 18 or the like can be placed in order to receive the dispensed beverage. Furthermore, in the spatially setback dispensing region of the machine 10, there may be provided a cartridge 19, which is insertable and exchangeable from the outside, for the purposes of water descaling.

To the left and to the right of the outlet unit 15, a hot-water outlet 16 and a steam lance 17 are arranged so as to project out and be directed downward, which hot-water outlet and steam lance are provided for example for the preparation of tea and for the foaming of milk for the preparation of a cappuccino or the like. The hot-water outlet 16 and the steam lance 17 are, directly thereabove on the readout and operator control unit 14, each assigned a corresponding hot-water button 14c and steam button 14d for activation purposes. Intuitive operator control of the machine is facilitated by means of this direct spatial assignment.

Figure 2:
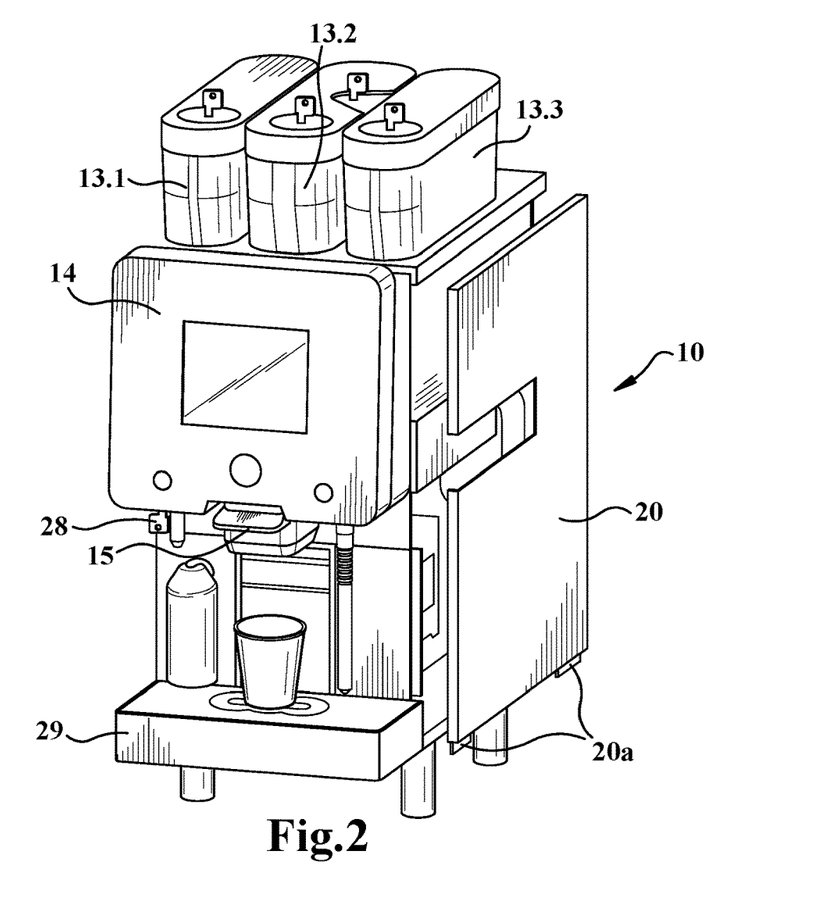
FIG. 2 shows, in a perspective view, the coffee machine from FIG. 1 with a side wall removed.
Figure 9A:
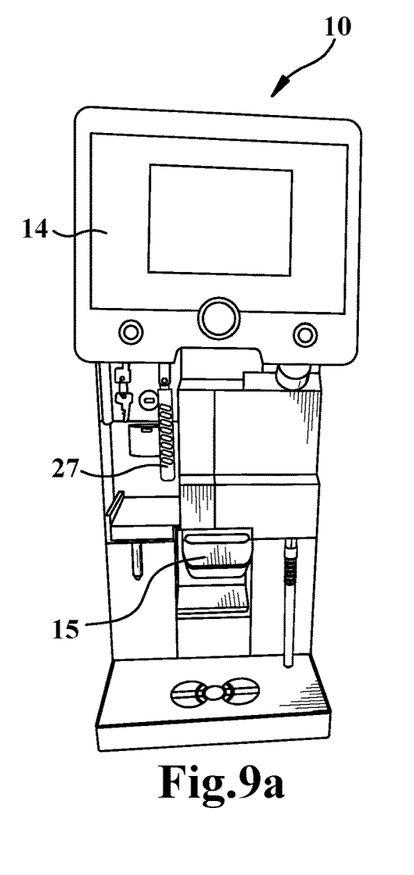
FIG. 9a shows the access to the lever mechanism when the operator control and readout unit has been displaced upward.
Figure 9B:
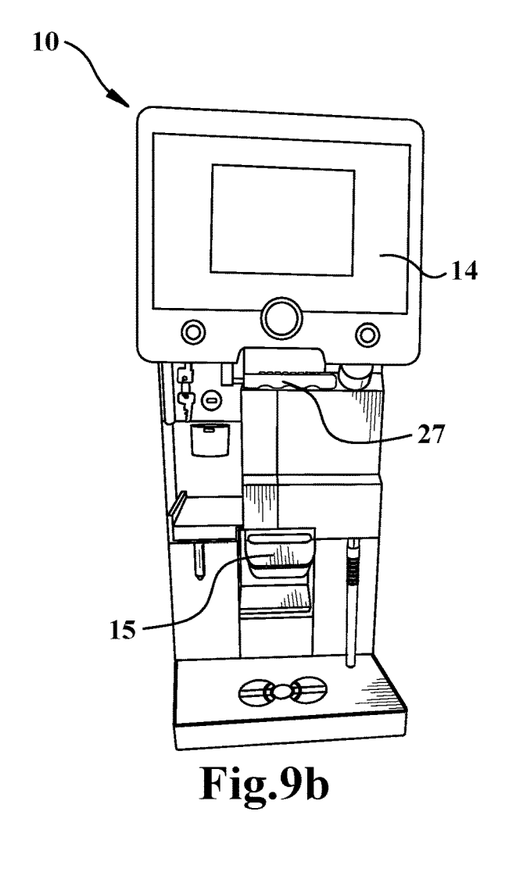
FIG. 9b shows the park position of the lever mechanism after the unlocking.

As can be seen from FIGS. 9a and 9b, the readout and operator control unit 14 is, in order to permit access to the interior of the machine, designed to be movable in terms of height between a normal position (FIG. 1, FIG. 2) and a service position (FIGS. 9a, 9b) situated thereabove. In order that the movement of the readout and operator control unit 14 can be performed only by authorized persons, the readout and operator control unit 14 is secured by means of a lock which can be actuated by means of a key 28 (FIG. 2).

The storage containers 13.1, 13.2 and 13.3 arranged on the top side of the housing 11 contain raw materials required for the preparation of the coffee beverage and possibly further beverages, in particular coffee beans. Accordingly, it is for example possible for the left-hand storage container 13.1 to contain cocoa powder for the preparation of a cocoa beverage, whereas the other storage containers 13.2 and 13.3 accommodate different types of coffee beans.

Figure 8:
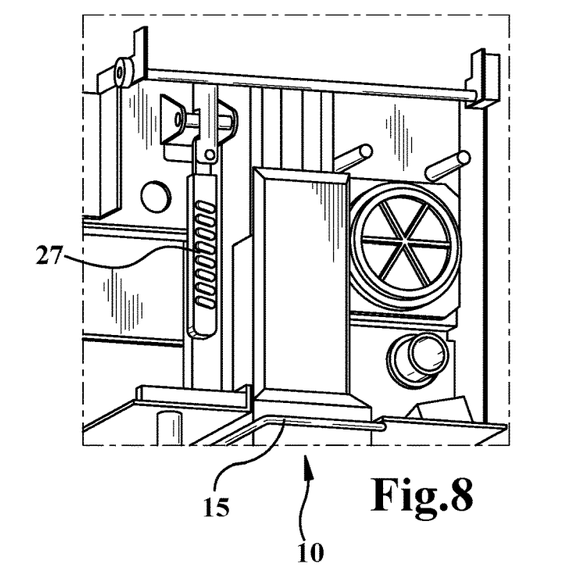
FIG. 8 shows the lever mechanism, which is visible when the operator control and readout unit is removed, for the locking and unlocking of the storage containers.

The storage containers 13 or 13.1, 13.2 and 13.3, which are lockable by means of corresponding keys (28 in 3a) on the cover, are mounted removably on the top side of the housing 11 and are lockable in the mounted state. For this purpose, behind the readout and operator control unit 14, there is arranged an actuation mechanism (27 in FIGS. 8 and 9a, 9b), by means of which actuation mechanism the storage containers 13 or 13.1, 13.2 and 13.3 can be locked in the mounted state and unlocked, and which actuation mechanism is accessible for the actuation only when the readout and operator control unit 14 is situated in the (upper) service position shown in FIGS. 9a and 9b.

The actuation mechanism has a pivotable actuation lever 27 which is pivotable between a locking position (FIGS. 8 and 9a), in which said actuation lever is vertical and in which the storage containers 13 or 13.1, 13.2 and 13.3 are locked, and an unlocking position, in which said actuation lever projects horizontally forward and in which the storage containers 13 or 13.1, 13.2 and 13.3 are unlocked. Since, after the unlocking, the readout and operator control unit 14 situated in the upper service position at least impedes access to the unlocked storage containers 13 or 13.1, 13.2 and 13.3 (which are at the same time closed at their outlet), but the actuation lever 27 pivoted out forward into the horizontal prevents the downward movement of the readout and operator control unit 14, the actuation lever 27 can, in the horizontal position as per FIG. 9*b*, be pivoted about a vertical axis toward the housing 11 in order to release the downward travel for the readout and operator control unit 14. In the situation illustrated in FIG. 9*b*, the readout and operator control unit 14 can then (when the storage containers 13 or 13.1, 13.2 and 13.3 are unlocked and closed) be moved (FIGS. 1 and 2) downward again from the service position in order to then permit unimpeded access to the storage containers 13 or 13.1, 13.2 and 13.3.

During the mounting and locking or opening of the storage containers 13 or 13.1, 13.2 and 13.3, the process takes place in the exactly reversed sequence.

Figure 3A:
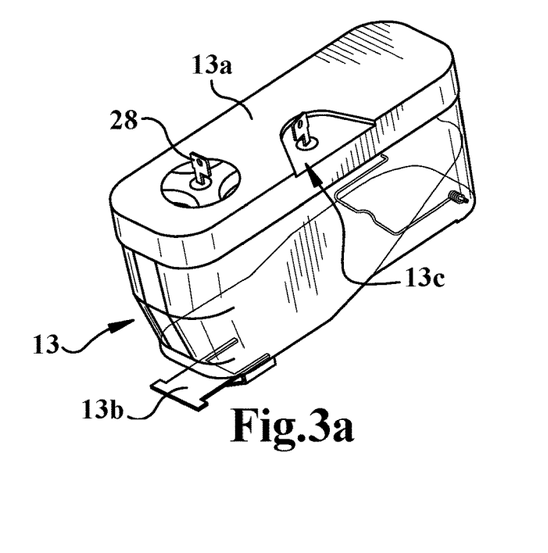
FIG. 3a shows, in a perspective view, one of the storage containers with a slot insert attached in the cover and with an open slide.

In FIG. 3*a*, the storage containers 13 (or 13.1, 13.2 and 13.3) each have, on the bottom side or in the base, a dispensing opening which can be opened and closed by means of a slide 13*b*. By means of the associated mechanism, the actuation lever 27 opens the respective slide 13*b* simultaneously with the locking of the mounted storage containers 13 or 13.1, 13.2 and 13.3 and closes the respective slide simultaneously with the unlocking, such that, when the containers are removed, no contents can inadvertently escape.

Figure 7:
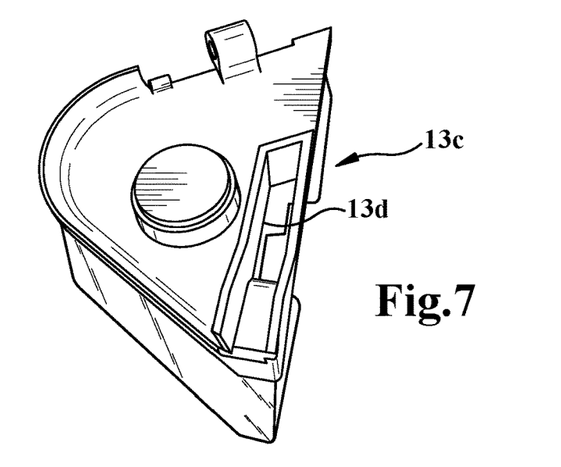
FIG. 7 shows, in an enlarged illustration, a slot insert for a storage container.

The storage containers 13 or 13.1, 13.2 and 13.3 are each equipped with a cover 13*a* which can be locked by means of a key 28 (FIG. 3*a*). At least one of the storage containers, in the exemplary embodiment the central storage container 13.2, has, in the cover 13*a*, a slot insert 13*c* (FIG. 3*a*, FIG. 7) with an introduction slot 13*d* for the introduction of a cleaning tablet by means of which the contaminating parts of the machine can be cleaned.

Figure 3B:
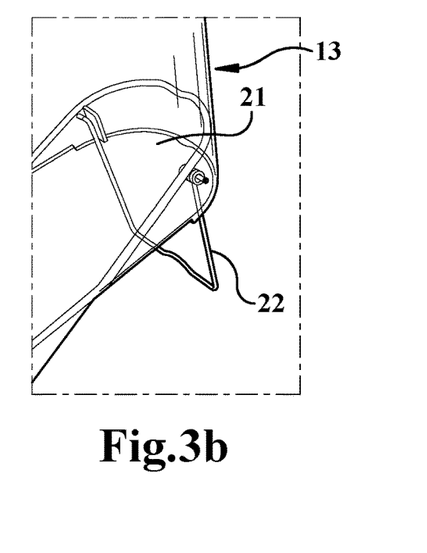
FIG. 3b shows one of the storage containers with a downwardly folded-out standing bracket.

In order that the storage containers 13 or 13.1, 13.2 and 13.3 can be securely set down in the removed and possibly filled state, they are each equipped with a standing bracket 22 which can be folded out, as shown in FIG. 3*b*, which standing bracket is accommodated below the container in a cavity formed by an obliquely rising container base 21 and is bent from a stable wire.

Figure 4:
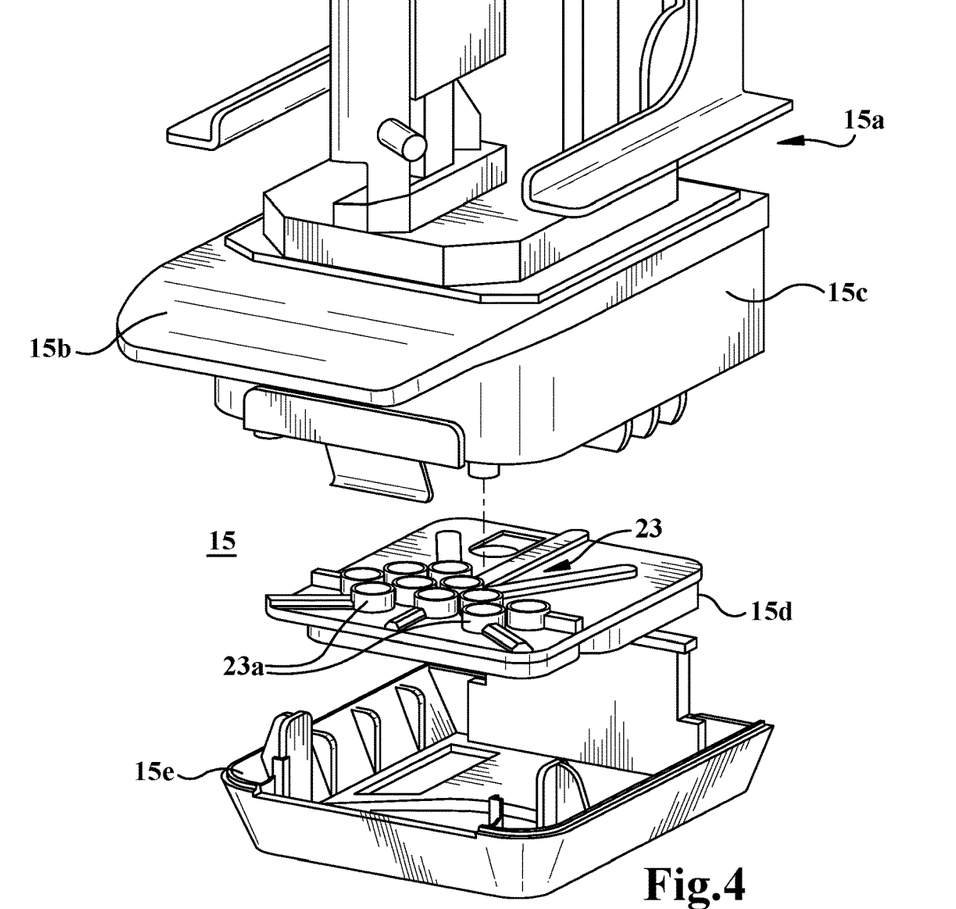
FIG. 4 shows an exemplary embodiment of an (open) outlet unit into which an elastomer outlet plate with a multiplicity of parallel outlets is insertable.
Figure 6:
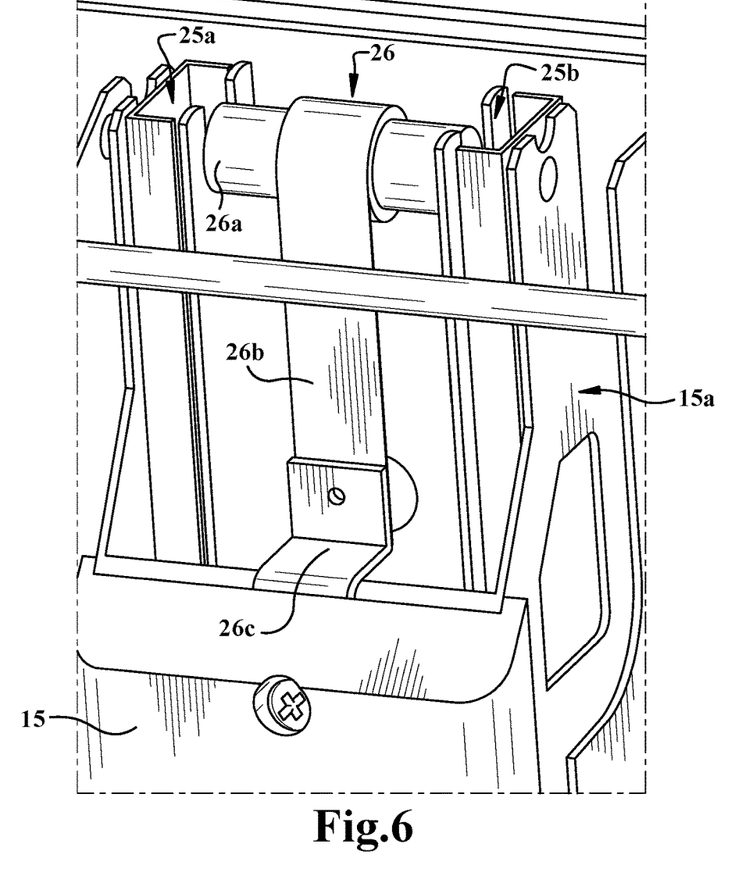
FIG. 6 shows details of a mechanism which operates with a spring strip and which effects a uniform movement of the outlet unit.

As already mentioned further above, the outlet unit 15 of the coffee machine 10 is designed to be movable in terms of height by means of a displacement mechanism 15*a* (FIG. 4, FIG. 6). Here, special means in the form of a spring mechanism 26 are provided, which means effect a uniform, in particular force-neutral, movement of the outlet unit 15 in terms of height.

For this purpose, as per FIG. 6, the outlet unit 15 is connected by means of an angled fastening element 26*c* to the free end of a spring strip 26*b* which can be rolled up on a rotatably mounted coil body 26*a*. The coil body 26*a* is arranged transversely between two vertical rails 25*a* and 25*b* in which the outlet unit 15 is guided during the movement. The spring strip 26*b*, which is produced for example from a suitable spring steel, is rolled up in spiral fashion in the rest state and builds up a retracting force when unrolled. Said spring strip is unrolled from the rolled-up rest state when the outlet unit 15 is moved downward, and rolls up again when the outlet unit 15 is moved upward. The retraction force of the unrolled spring strip 26*b* at least partially compensates the weight forces exerted on the outlet unit 15 by the weight thereof, such that a substantially uniform movement of the unit is possible.

In the interior of the outlet unit 15 there is provided an outlet arrangement 23 (FIG. 4 and FIG. 5) in which a multiplicity of vertically oriented tubular outlets 23*a* composed of an elastomer material, in particular silicone rubber or rubber, are arranged adjacent to one another. Said outlets 23*a* receive, at the upper end, the ends of the dispensing lines (not illustrated) for the various beverages and beverage additives, and form, at the lower end, the actual outlet opening for the respective liquids to be dispensed.

Figure 5:
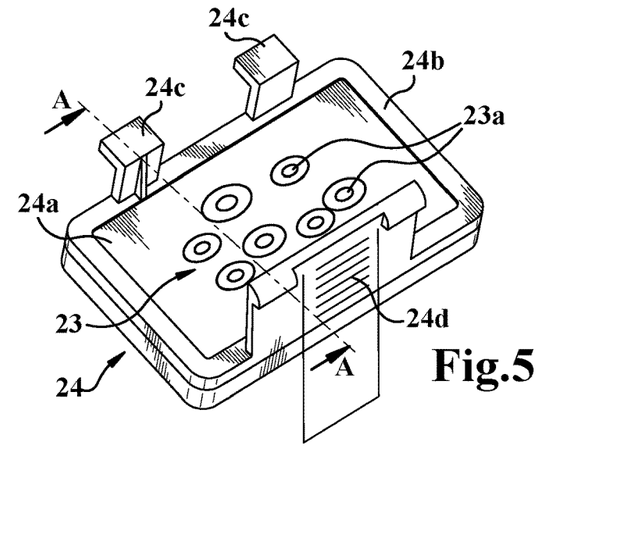
FIG. 5 shows an outlet plate alternative to FIG. 4 of composite form with an elastomer seal part and with a frame part fixedly connected thereto.

This has the result that, on the lower ends of the outlets 23*a*, possible residues (droplets and the like) of the dispensed liquids remain adhered, build up and, over time, can form a stable crust. Since the outlets 23*a* are composed of an elastomer material, they can be easily deformed for cleaning purposes, such that built-up crusts can be flaked off and easily removed. In order that the cleaning can be performed easily, the outlets 23*a* are mounted removably in the outlet unit 15.

Here, two variants, shown in FIGS. 4 and 5, are possible, in which the outlets 23*a* are part of an outlet plate 15*d* or 24 which is composed at least partially of an elastomer material and which extends transversely with respect to the outlet direction:

In one variant (FIG. 4), the outlet plate 15*d* is, as an independent part, composed entirely of the elastomer material and is held in an outlet housing 15*c*, arranged below the grip plate 15*b*, of the outlet unit 15 by means of a (stable) holding frame 15*e* which can be mounted, and inserted with latching-in action, from below.

In the other variant (FIG. 5), the outlet plate 24 is, as a composite part, constructed from an elastomer seal part 24*a* with the outlets 23*a* and from a dimensionally stable frame part 24*b*, which is connected to said seal part and which has suspension hooks 24*c* and an oppositely situated detent hook 24*d* and which is, by way of the frame part 24*b*, insertable with latching-in action into the outlet unit 15. By means of the 2-component composite part 24, the operator control and cleaning of the machine are further simplified.

Finally, the operator control and maintenance of the coffee machine can be further simplified and improved in that, as per FIG. 2, the housing 11 has removable side and/or rear walls 20 which are held magnetically on the housing 11. For this purpose, an exemplary side wall 20 has, distributed on the lower edge, downwardly protruding mounting tongues 20*a* by means of which the side wall is insertable into a corresponding groove on the housing frame and can then be pivoted, with magnetically latching-in action, onto the housing frame.

The present invention is not limited in terms of its scope to the specific embodiments described here. Rather, in addition to the examples disclosed here, various further modifications of the present invention will emerge to a person skilled in the art from the description and from the associated figures, which modifications likewise fall within the scope of protection of the claims. Furthermore, in the description, various references are cited, the entire content of disclosure of which is hereby incorporated into the description by reference.

LIST OF REFERENCE DESIGNATIONS

10 Coffee machine (coffee maker)
11 Housing
12 Foot
13 Storage container (for example coffee bean container)
13.1-13.3 Storage container (for example coffee bean container)
13*a* Cover (closable)
13*b* Slide
13*c* Slot insert (for cleaning tablet)
13*d* Introduction slot
14 Readout and operator control unit
14*a* Display 14b Analog readout (for example manometer)
14c Hot-water button
14d Steam button
15 Outlet unit (displaceable in terms of height)
15a Displacement mechanism
15b Grip plate
15c Outlet housing
15d Outlet plate (composed for example of rubber, silicone rubber)
15e Holding frame (capable of being latched in)
16 Hot-water outlet
17 Steam lance
18 Beaker
19 Cartridge (for example descaling; exchangeable)
20 Side wall (removable)
20a Mounting tongue
21 Container base
22 Standing bracket (capable of being folded out)
23 Outlet arrangement
23a Outlet (tubular)
24 Outlet plate (2K, two-component)
24a Seal insert (composed for example of rubber, silicone rubber)
24b Frame part
24c Suspension hook
24d Detent hook
25a,b Rail
26 Spring mechanism
26a Coil body
26b Spring strip
26c Fastening element
27 Actuation lever (coffee container)
28 Key
29 Collecting tray

The invention claimed is:

1. An outlet plate for a coffee machine,
the outlet plate having an essentially planar shape and comprising a multiplicity of straight tubular outlets through the outlet plate;
wherein said outlets are arranged adjacent to one another and parallel to an outlet direction,
wherein said outlet direction is perpendicular to a plane of the outlet plate,
wherein the outlet plate is at least partially composed of an elastomer material,
wherein said outlets each have an upper end on a first side of the outlet plate for receiving a beverage or beverage additive from a dispensing line of the coffee machine, and an outlet opening on a second side of the outlet plate opposite to the first side of the outlet plate for dispensing the beverage or beverage additive,
wherein said tubular outlets are composed of said elastomer material,
wherein said outlets are elastically deformable for flaking off crusts built-up on the outlet opening,
wherein the outlet plate is insertable into an outlet unit of the coffee machine by a latching-in action, and
wherein the outlet plate includes a dimensionally stable frame part that comprises a detent hook for latching the outlet plate to the outlet unit of the coffee machine.

2. The outlet plate as claimed in claim 1, wherein the outlet plate is a composite part comprising an elastomer seal part and the dimensionally stable frame part.

3. The outlet plate as claimed in claim 2, wherein the dimensionally stable frame part surrounds the elastomer seal part.

4. The outlet plate as claimed in claim 1, wherein said elastomer material is silicone rubber or rubber.

5. A coffee machine for the automatic preparation of a coffee beverage or other further beverages, comprising a housing, in which a grinding mechanism, a brewing device, a boiler, are accommodated, and the outlet unit, via which the desired beverage is dispensed;
wherein the outlet unit comprises the outlet plate as claimed in claim 1, which is removably mounted in the outlet unit for the purposes of easy cleaning;
wherein the outlet direction of the tubular outlets of the outlet plate is vertically oriented; and
wherein outlets lines for the beverages or beverage additives discharge into an upper end of the tubular outlets.

6. The coffee machine as claimed in claim 5, wherein the outlet plate is a composite part comprising an elastomer seal part and the dimensionally stable frame part, and wherein the outlet plate is, by way of the dimensionally stable frame part, insertable into the outlet unit.

7. The outlet plate as claimed in claim 1, wherein openings of each of the multiplicity of tubular outlets extend through the outlet plate between opposite facing surfaces of the outlet plate.

8. The outlet plate as claimed in claim 1, wherein the dimensionally stable frame part comprises at least one suspension hook positioned opposite the detent hook.

* * * * *